(12) United States Patent
Schümann et al.

(10) Patent No.: US 9,234,122 B2
(45) Date of Patent: Jan. 12, 2016

(54) BLACK SILANE PRIMER FOR IMPROVING THE ADHESION OF ADHESIVE TAPES TO GLASS SURFACES

(71) Applicant: tesa SE, Hamburg (DE)

(72) Inventors: Uwe Schümann, Pinneberg (DE); Sebastian Dietze, Hamburg (DE); Kai Ellringmann, Hamburg (DE); Marco Kupsky, Quickborn (DE); Thilo Dollase, Hamburg (DE)

(73) Assignee: TESA SE, Hamburg (DE)

( * ) Notice: Subject to any disclaimer, the term of this patent is extended or adjusted under 35 U.S.C. 154(b) by 106 days.

(21) Appl. No.: 13/887,961

(22) Filed: May 6, 2013

(65) Prior Publication Data
US 2014/0309346 A1    Oct. 16, 2014

(30) Foreign Application Priority Data

Apr. 11, 2013   (DE) .......................... 10 2013 206 376

(51) Int. Cl.
| | | |
|---|---|---|
| *C08K 5/15* | (2006.01) | |
| *C09J 133/08* | (2006.01) | |
| *C08K 3/22* | (2006.01) | |
| *C08K 5/54* | (2006.01) | |
| *C09J 139/04* | (2006.01) | |
| *C09J 139/06* | (2006.01) | |

(52) U.S. Cl.
CPC .................. *C09J 133/08* (2013.01); *C08K 3/22* (2013.01); *C08K 5/54* (2013.01); *C09J 139/04* (2013.01); *C09J 139/06* (2013.01)

(58) Field of Classification Search
CPC ........... C08L 39/04; C08L 39/06; C08K 3/22; C08K 5/5415
USPC .................................. 524/114, 264, 188, 401
See application file for complete search history.

(56) References Cited

U.S. PATENT DOCUMENTS

| | | | | |
|---|---|---|---|---|
| 5,112,682 A | * | 5/1992 | Inouye et al. | 428/353 |
| 5,677,376 A | * | 10/1997 | Groves | 525/73 |
| 6,646,048 B2 | | 11/2003 | Matsuda et al. | |
| 6,787,585 B2 | * | 9/2004 | Rose et al. | 523/135 |

FOREIGN PATENT DOCUMENTS

WO    2008094721 A1    8/2008

OTHER PUBLICATIONS

P.E. Hinkamp, "A Table of Fikentscher K Values versus Relative Viscosities for a Concentration of 1.0", Plastics Production Research Service, Michigan, USA, Jan. 1966, pp. 381-384.

\* cited by examiner

*Primary Examiner* — Wenwen Cai
(74) *Attorney, Agent, or Firm* — Norris McLaughlin & Marcus PA

(57) ABSTRACT

The invention relates to a primer, comprising a mixture dissolved or dispersed in one or more solvents, the mixture composed of a copolymer obtained through copolymerization, preferably free-radical copolymerization, of vinylcaprolactam and/or vinylpyrrolidone, and one or more of the following monomers: a) an acrylic acid ester of a linear primary alcohol containing 2 to 10 carbon atoms in the alkyl group of the alcohol, b) an acrylic acid ester of a branched, non-cyclic alcohol having 4 to 12 carbon atoms in the alkyl group of the alcohol, and c) acrylic acid; one or more organofunctional silanes; a dye or a pigment based on a metal complex or a metal oxide, wherein the metal oxide is of a spinel-type. Such primer provide reliable and excellent adhesion between pressure-sensitive adhesive tapes and hydrophilic surfaces, in particular glass, and ensures at the same time a good coloration of the primer, thereby producing an opaque primer layer.

17 Claims, No Drawings

BLACK SILANE PRIMER FOR IMPROVING THE ADHESION OF ADHESIVE TAPES TO GLASS SURFACES

This application claims priority to the German patent application DE 10 2013 206 376.8 filed Apr. 11, 2013.

The present invention relates to a primer composition that provides good adhesion of adhesive tape to glass surfaces, while enabling opaque coloring of the primer layer.

STATE OF THE ART

Primers, frequently referred to as bonding agent or adhesion promoter, are widely known in the form of commercial products or the technical literature. An overview of the substances or classes of substances used in primer formulations can be found in J. Bielemann, Paint Additives (1998), Ch. 4.3., pp. 114-129.

Primer compositions are disclosed in numerous patents; however, primers for improving in adhesion of tapes are described in only a few publications.

In the document WO 2008/094 721 A1, a primer composition for tape applications is proposed based on a maleic-anhydride-modified polyolefin and an organic diamine, which are intended to improve adhesion to polyolefin-based materials.

JP 2008-156566 A discloses a primer composition for tape applications based on an acidic acrylate-based polymer and a fluorine-containing copolymer.

To improve the adhesion of an adhesive tape on melamine-resin painted substrates, WO 02/100961 A1 proposes a primer composition which includes a grafted copolymer of an acrylate copolymer, grafted with an aminoalkyl group containing terminal primary amino groups, and further includes an acrylate copolymer with carboxyl groups in the molecular chain and a solvent.

WO 03/052 021 A1 discloses a primer composition which includes a polydiorganosiloxane polyurea having electron-rich groups and which may have the form of a primer, an adhesive, a pressure-sensitive adhesive or another coating material. This primer composition is also mentioned in connection with tape applications.

The documents EP 833 865 B1, EP 833 866 B1, EP 739 383 B1 and U.S. Pat. No. 5,602,202 describe primer compositions based on mixtures of styrene/diene block copolymers or styrene/hydrogenated diene block copolymers and selected polyacrylates which are intended to improve the adhesion of double-sided foamed, pressure-sensitive adhesive tapes on both low-energy and high-energy surfaces.

DE 10 2011 077 510 A1 discloses a primer suitable for improving the adhesion of adhesive tapes on difficult to bond substrates, especially on galvanized steel, as well as on olefin-based thermoplastic elastomers, for example PP/EPDM.

However, none of the above documents addresses the adhesion to glass.

To promote adhesion to hydrophilic surfaces such as glass, silane primers or silane coupling agents or adhesion promoters are frequently used. These are described, for example, in DE 10 2009 007 930 A1 or DE 10 2007 030 196 A1, further in EP 577 014 A1, EP 1 693 350, EP 1 730 247, US 2008 0245 271, US 2008 023 425 or WO 2008/025846.

However, the compounds disclosed in the aforementioned documents are at best moderately suited for improving the adhesion of adhesive tape on glass, because they do not contain suitable components that improve the adhesion to a pressure-sensitive adhesive, in particular the adhesion to a pressure-sensitive adhesive based on a copolymer of acrylic acid esters and optionally acrylic acid.

When, in addition, the incorporation of functional fillers in the primer is desired, the compounds of the cited documents fall short completely because the very low-viscosity dispersions, solutions or preparations are unable to absorb such fillers. Therefore, it is in particular not possible to color such primers, especially when the coloring should be opaque.

U.S. Pat. No. 6,646,048 B2 discloses a primer composition made from a reactive acrylic resin, which consists of two different methacrylates, at least one of which has a side chain with at least one aromatic ring, a silane compound, an epoxy resin of the type bisphenol A, and carbon black. Although this primer composition composed of a reactive acrylic resin and a silane is suitable to improve the adhesion of a urethane-based sealant or of a reactive adhesive to glass, it is completely unsuitable to improve the adhesion of a pressure-sensitive adhesive tape on glass. Unlike a urethane-based sealant or a reactive adhesive which can still be cross-linked after application and thus reactively form a chemical compound with the primer, the polymer base of the pressure-sensitive adhesives on adhesive tapes is no longer reactive after the application of the adhesive tape, so that a desired adhesion improvement is not achieved with the primer composition of the US document.

THE OBJECT OF THE INVENTION

It is therefore an object of the invention to provide a primer for improving the adhesion of adhesive tapes, in particular adhesive tapes having a pressure-sensitive adhesive based on thermally cross-linked copolymers of acrylic acid esters and acrylic acid, especially on hydrophilic surfaces such as glass. The primer should preferably have an opaque coloration, without eliminating or measurably reducing the adhesion-promoting effect of the primer.

Solution of the Object

In broad aspects of the invention there are provided a primer, a potential use and a method for producing an adhesion-promoting layer from the primer.

Accordingly, the invention relates to a primer which includes a mixture dissolved or dispersed in one or more solvents, with the mixture composed of a copolymer obtained through copolymerization, preferably free-radical copolymerization, of vinylcaprolactam and/or vinylpyrrolidone, and one or more of the following monomers:

a) an acrylic acid ester of a linear primary alcohol containing 2 to 10 carbon atoms in the alkyl group of the alcohol, b) an acrylic acid ester of a branched, non-cyclic alcohol having 4 to 12 carbon atoms in the alkyl group of the alcohol, c) acrylic acid, one or more organofunctional silanes, and a dye or a pigment based on a metal complex or a metal oxide, wherein the metal oxide is of a spinel-type.

"Vinylcaprolactam" refers herein to N-vinyl caprolactam (CAS-No. 2235-00-9) and "vinylpyrrolidone" refers herein to N-vinyl-2-pyrrolidone (CAS-No. 88-12-0).

A dye or pigment based on a metal complex or a metal oxide is to be understood as a colorant, with—preferably organic—ligands forming a complex with a metal cation such as chromium or copper. Metal oxide colorants of the spinel-type are those metal oxides having a spinel lattice structure.

Surprisingly, it has been observed that such primers have excellent adhesion to hydrophilic substrates, in particular glass. Adhesive tapes, especially those with polar adhesives, in particular adhesives based on polyacrylic acid ester, exhibit excellent adhesion to the primer. Thus, the primer is an excellent bonding agent for bonding adhesive tapes on glass.

Moreover, the primer has an opaque coloration, without eliminating or measurably reducing its adhesion-promoting effect. Even when a dye or a pigment is present in a concentration that corresponds to a multiple of the silane concentration, the adhesion-promoting effect is not impaired. Instead, the adhesive tapes still adhere well even with this dye or pigment concentration in the primer, so that cohesive failure within the adhesive tape takes place in a peel test in adhesion to glass.

DETAILED DESCRIPTION OF THE INVENTION

A primer in the context of the specification refers in accordance with DIN EN ISO 4618 to a coating material for producing a base coat. Generally, a primer or a coating material is applied to the surface of a substrate, whereafter a film is formed through evaporation of the solvent and/or through another chemical or physical curing or film-formation process, and an additional different substance, for example a lacquer, a paint, an adhesive or an adhesive tape can subsequently be applied on the thus produced layer. A prerequisite for an adhesion-promoting effect of a primer is that, on the one hand, a very good adhesion of the primer layer to the substrate is achieved, wherein the surface of the substrate is referred to in this document as a base and that, on the other hand, the other material to be applied also adheres well to the prepared primer layer. A primer has an optimum adhesion-promoting effect when an attempt to peel of the substance applied on the primer or the adhesive product applied on the primer, for example the adhesive tape, causes a cohesive failure within the substance, the adhesive product or the adhesive tape, or the substrate on which the above primer has been applied is destroyed. When the forces required to peel off the substance, the adhesive product or the adhesive tape applied to the primer are higher than in a situation when no primer is used, the adhesion or the adhesion force is improved. The higher these forces are, the greater the improvement in the adhesion and the adhesion force.

A solvent in the context of the specification refers to any known liquid which is suitable to dissolve or at least finely disperse the mixture disclosed herein. Preferred solvents according to the invention are organic solvents such as alcohols, esters, ketones, aliphatic or aromatic hydrocarbons and halogenated hydrocarbons, to mention just a few examples. Water or other inorganic solvents also fall within the scope of the invention as being useful.

A dispersed mixture in the context of the specification refers to a finely distributed homogeneous mixture. The degree of the fine dispersion and homogeneity is not strictly defined, but must be sufficient to produce a contiguous layer after the coating and result in a size of the agglomerates or aggregates that are not dissolved at the molecular level so as to ensure the function of the primer layer as an adhesion-promoting layer.

The essential feature of the mixture contained in the primer according to the invention is that this mixture includes at least one copolymer, preferably obtained by free-radical copolymerization, of the following monomers:

Vinylcaprolactam and/or vinylpyrrolidone and one or more of the following monomers:
a) an acrylic acid ester of a linear primary alcohol containing 2 to 10 carbon atoms in the alkyl group of the alcohol,
b) an acrylic acid ester of a branched non-cyclic alcohol having 4 to 12 carbon atoms in the alkyl group of the alcohol,
c) acrylic acid,
wherein the sum of vinylcaprolactam and/or vinylpyrrolidone and the components a) to c) advantageously constitutes—for each with a plurality of copolymers—100 weight-percent of the copolymer.

Particularly advantageous is an above-described primer, wherein the copolymer is a pressure-sensitive adhesive.

A pressure-sensitive adhesive in the context of the specification refers, as in commonly used terminology, to a substance that is permanently sticky and tacky—especially at room temperature. A pressure-sensitive adhesive is characterized in that it can be applied onto a substrate by pressure and then adheres thereto, wherein the applied pressure and the duration of this pressure application are not defined in detail. In some cases, depending on the exact nature of the pressure-sensitive adhesive, the temperature and the humidity, and the substrate, application of a brief minimum pressure which is not higher than a light short-time touch is sufficient for attaining the adhesion effect; in other situations, a longer duration of an applied high pressure may be necessary.

Pressure-sensitive adhesives have special characteristic viscoelastic properties that result in permanent tackiness and stickiness.

It is characteristic of the adhesives that both viscous flow processes occur and elastic restoring forces are produced following mechanical deformation. Both processes occur with a certain ratio to each other, depending on the specific composition, the structure and the degree of cross-linking of the particular pressure-sensitive, as well as on the speed and duration of the deformation and on the temperature.

The proportional viscous flow is necessary to achieve adhesion. Only the viscous components, caused by macromolecules with relatively high mobility, provide good wetting and good flow to the substrate to be bonded. A high proportion of viscous flow leads to a high tackiness (also referred to as tack or surface tackiness) and hence frequently also to a high adhesive strength. Highly cross-linked systems, crystalline or glassy solidified polymers are, due to a lack of flowable components, typically not at all or at least only slightly tacky.

The proportional elastic restoring forces are necessary to achieve cohesion. They are caused, for example, by very long-chain and highly convoluted macromolecules and by physically or chemically cross-linked macromolecules and enable the transfer of forces acting on an adhesive bond. They allow an adhesive bond to sufficiently withstand a permanent applied load, for example in the form of a permanent shear stress, over a prolonged time.

The quantities storage modulus (G') and loss modulus (G") determinable by Dynamic Mechanical Analysis (DMA) can be used for a more precise description and quantification of the elastic and viscous component and the ratio of these components to each other. G' is a measure of the elastic component, G" is a measure of the viscous component of a substance. Both values depend on the deformation frequency and the temperature.

The quantities can be determined using a rheometer. The material to be examined is thereby subjected, for example, to a sinusoidally oscillating shear stress in a plate-plate arrangement. The deformations are measured as a function of time and the time offset of the deformation is measured relative to the introduction of shear stress with shear-stress-controlled devices. This time delay is called the phase angle δ.

The storage modulus G' is defined as follows: $G'=(T/\gamma)\cdot \cos(\delta)$ (T=shear stress, γ=deformation, δ=phase angle=phase shift between shear stress and deformation vector). The definition of the loss modulus G" is: $G''=(T/\gamma)\cdot \sin(\delta)$ (T=shear stress, γ=deformation, δ=phase angle=phase shift between shear stress and deformation vector).

A substance is generally regarded as tacky and will be considered tacky in the context of the specification, when at room temperature, herein defined as at 23° C., G' is at least partly in the range from $10^3$ to $10^7$ Pa in the deformation frequency range of $10^0$ to $10^1$ rad/sec, and when G" is also at least partially in this range. The term partly means, that at least a segment of the curve G' is within the window spanned by the deformation frequency range of from $10^0$ through $10^1$ rad/sec (abscissa) and the region of the G' values from and including $10^3$ to and including $10^7$ Pa (ordinate), and when at least a segment of the curve G" is also within this window.

Pressure-sensitive adhesives containing vinylcaprolactam and/or vinylpyrrolidone in the copolymer typically have only average adhesive properties. It was therefore even more surprising when it was discovered in the context of the present invention that a primer containing as an pressure-sensitive adhesive an inventive copolymer with vinylcaprolactam and/or vinylpyrrolidone as monomer components, exhibits outstanding adhesion-promoting properties as a primer and produces a very strong bond of adhesive tapes to the hydrophilic substrate, in particular glass.

A primer with a copolymer obtained through copolymerization, preferably free-radical copolymerization, of vinylcaprolactam and/or vinylpyrrolidone, and one or more of the following monomers:
a) an acrylic acid ester of a linear primary alcohol containing 2 to 10 carbon atoms in the alkyl group of the alcohol,
b) an acrylic acid ester of a branched, non-cyclic alcohol having 4 to 12 carbon atoms in the alkyl group of the alcohol,
c) acrylic acid,
i.e. which consists only of these components without the presence of other copolymerizable monomers and where the copolymer is a pressure-sensitive adhesive, is particularly suitable and has very good adhesion-promoting properties. The copolymer is thus limited to vinylcaprolactam and/or vinylpyrrolidone, and the components a) to c), such that the copolymer is not based on any other copolymerizable monomers other than linear acrylic acid esters with 2 to 10 C atoms in the alkyl group of the alcohol, branched non-cyclic acrylates with 4 and up to and including 12 carbon atoms in the alkyl group of the alcohol, and acrylic acid. The pressure-sensitive adhesive as part of the primer according to the invention is characterized in that other—especially softening—comonomers and components other than those listed can be eliminated. For example, comonomers with cyclic hydrocarbon components can be completely eliminated.

Linear alkyl acid esters having 2 to 10 carbon atoms in the alkyl group are ethyl acrylate, n-propyl acrylate, n-butyl acrylate, n-pentyl acrylate, n-hexyl acrylate, n-heptyl acrylate, n-octyl acrylate, n-nonyl acrylate, n-decyl acrylate.

Branched non-cyclic acrylates having 4 up to and including 12 carbon atoms in the alkyl group of the alcohol are preferably selected from the group consisting of 2-ethylhexyl acrylate (EHA), 2-propylheptyl acrylate, isooctyl acrylate, isobutyl acrylate, isoamyl acrylate and/or isodecyl acrylate. Particularly advantageously, branched non-cyclic acrylates 2-ethylhexyl acrylate (EHA), 2-propylheptyl acrylate and/or isooctyl acrylate (specifically, the acrylic acid esters in which the alcohol component originates from a mixture of primary isooctanoles, i.e. those alcohols which can be obtained from an isoheptene a mixture by hydroformylation and subsequent hydrogenation) may be used.

Very preferred is a pressure-sensitive adhesive with a copolymer based on vinylcaprolactam and/or vinylpyrrolidone and a monomer of the type a), wherein particularly preferred n-butyl acrylate is selected as the monomer of the type a). Vinyl caprolactam is particularly preferred as another monomer. Therefore, a particularly suitable copolymer is composed of the two components of vinyl caprolactam and n-butyl acrylate.

According to another advantageous embodiment of the present invention, the copolymer includes up to 10 percent by weight of additional copolymerizable monomers, based on the sum of the monomers.

Optional additional copolymerizable monomers that can be used up to 10 weight-percent without any particular limitation, may include all radically polymerizable C=C double bond-containing monomers or monomer mixtures known to those skilled in the art. Some examples of these monomers are: methylacrylate, ethylacrylate, propylacrylate, methylmethacrylate, ethylmethacrylate, benzylacrylate, benzylmethacrylate, sec.-butylacrylate, tert.-butylacrylate, phenylacrylate, phenylmethacrylate, isobornylacrylate, isobornylmethacrylate, t-butylphenylacrylate, t-butylphenylmethacrylate, dodecylmethacrylate, laurylacrylate, n-undecylacrylate, stearylacrylate, tridecylacrylate, behenylacrylate, cyclohexylmethacrylate, cyclopentylmethacrylate, phenoxyethylacrlylate, phenoxyethylmethacrylate, 2-butoxyethylmethacrylate, 2-butoxyethylacrylate, 3,3,5-trimethylcyclohexylacrylate, 3,5-dimethyladamantylacrylate, 4-cumyl-phenylmethacrylate, cyanoethylacrylate, cyanoethylmethacrylate, 4-biphenylacrylate, 4-biphenylmethacrylate, 2-naphthylacrylate, 2-naphthylmethacrylate, tetrahydrofufuryl-acrylate, maleinic anhydride, hydroxyethylacrylate, hydroxypropylacrylate, hydroxyethylmethacrylate, hydroxypropylmethacrylate, 6-hydroxyhexylmethacrylate, allylalcohol, glycidylacrylate, glycidylmethacrylate, 2-butoxyethylacrylate, 2-butoxyethylmethacrylate, 3-methoxyacrylsauremethylester, 3-methoxybutylacrylate, phenoxyethylacrylate, phenoxy-ethylmethacrylate, 2-phenoxyethylmethacrylate, butyldiglykolmethacrylate, ethylenglycolacrylate, ethylenglycolmonomethylacrylate, methoxy polyethylenglykolmethacrylat 350, methoxy polyethylenglykolmethacrylat 500, propylenglycolmonomethacrylate, butoxydiethylenglykolmethacrylate, ethoxytriethylenglykolmethacrylate, octafluoropentylacrylate, octafluoropentylmethacrylate, 2,2,2-trifluoroethylmethacrylate, 1,1,1,3,3,3-hexafluoroisopropylacrylate, 1,1,1, 3,3,3-hexafluoroisopropylmethacrylate, 2,2,3,3,3-pentafluoropropylmethacrylate, 2,2,3,4,4,4-hexafluorobutylmethacrylate, 2,2,3,3,4,4,4-Heptafluorobutylacrylate, 2,2,3,3,4,4,4 heptafluorobutylmethacrylate, 2,2,3,3,4,4,5,5,6,6,7,7,8,8,8 pentadecafluorooctylmethacrylate, dimethylaminopropylacrylamide, dimethylaminopropylmethacrylamide, N-(1-methyl-undecylenic acid) acrylamide, N-(n-butoxymethyl) acrylamide, N-(butoxymethyl)methacrylamide, N-(ethoxymethyl)acrylamide, N-(n-octadecylenic acid) acrylamide, additionally N,N-dialkyl-substituted amide, for example N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide, Acrylonitrile, methacrylonitrile, vinylether, such as vinylmethylether, ethylvinylether, vinylisobutylether, vinylester, such as vinylacetat, vinylchloride, vinylhalogenide, vinylidenchloride, Vinylidenhalogenide, vinylpyridine, 4-vinylpyridine, N-acrylnitrile, Styrene, a- and p-methylstyrene, a-butylstyrene, 4-n-butylstyrene, 4-n-decylstyrene, 3,4-dimethoxystyrene. Macromonomers such as 2-polystyrene ethylmethacrylat (molecular weight MW 4000-13000 g/mole), poly (methyl) methacrylate (MW 2000 to 8000 g/mole).

Preferably, the copolymer of the primer of the invention has a maximum of 50 weight-percent, preferably not more than 40 weight-percent of vinylcaprolactam and/or vinylpyrrolidone, based on the sum of all monomers in the copolymer. Furthermore, preferably the copolymer of the primer according to the invention contains at least 15 weight-percent, preferably at least 20 weight-percent, of vinylcaprolactam and/or vinylpyrrolidone, based on the sum of all the monomers of the copolymer, wherein 30 weight-percent of vinylcaprolactam and/or vinylpyrrolidone are particularly preferred.

With respect to the fraction of acrylic acid, a fraction of the copolymer of 20 weight-percent, preferably of 10 weight-percent, particularly preferred of 0 weight-percent, based on the sum of all monomers of the copolymer is particularly advantageous.

Advantageously, the cross-linking of monomers to the copolymer is produced by thermal cross-linking. The term "thermal cross-linking" refers to the fact that the chemical cross-linking reaction(s) is/are initiated by a temperature effect and not by exposure to radiation. The cross-linking reactions in the present invention are therefore preferably not initiated by actinic or ionizing radiation such as UV, X-rays or electron beams. The temperature at which the chemical cross-linking reactions are initiated can be at room temperature or even lower. The cross-linking reaction starts after evaporation of the solvent.

Additional components of the pressure-sensitive adhesive may be, for example, other polymers, resins, plasticizers, stabilizers, rheological additives, fillers, cross-linking agents, initiators, catalysts, accelerators and the like, which are known to a person skilled in the art as additives or as components for pressure-sensitive adhesives.

Advantageously, the primer of the invention is free of additional other polymers, in particular chlorinated polyolefins. Advantageously, additional cross-linkers are also absent. The absence of epoxy resins also provides particularly suitable primers. The primer of the invention advantageously also contains no plasticizers, no initiators, catalysts or accelerators.

A chlorinated polyolefin refers to a polyolefin that has been chlorinated. The term epoxy resins refers here to all non-cross-linked oligomers which are solid or liquid at room temperature, are soluble in suitable solvents, and have two or more epoxide groups.

As already stated above, the at least one organofunctional silane of the present invention relates to compounds of the general formula $(R^1O)_3Si—R^2X$ or $(R^1O)_2(R^3) Si—R^2X$. Typical examples for the substituent $(R^1O)$ are methoxy-, ethoxy-, 2-methoxyethoxy- and acetoxy-groups. The substituent $R^3$ is typically a methyl group. Typical substituents $R^2$ considered are the groups X 3-glycidoxypropyl-, vinyl-, methacryloxymethyl-, 3-methacryloxypropyl-, methyl-, isooctyl-, hexadecyl-, cyclohexyl- or phenyl-, to name a few examples.

Particularly preferred are organofunctional silanes, which are in the present example glycidoxy-functional. Mentioned here are in particular 3-glycidoxypropyltrimethoxysilane and 3-glycidoxypropyltriethoxysilane, which are marketed by the company Wacker under the product name GENIOSIL® GF 80 and GF® GENIOSIL GF 82.

Also preferred are those organofunctional silanes that are vinyl-functional or amino-functional. N-cyclohexylaminomethyl-methyldiethoxysilane, cyclohexylamino methyltriethoxysilane N, N-phenylaminomethyl trimethoxysilane, N-(2-aminoethyl)-3-amino-propyl trimethoxysilane, N-cyclohexyl-3-aminopropyl trimethoxysilane, 3-aminopropyl triethoxysilane, N-(2-aminoethyl)-3-aminopropylmethyl dimethoxysilane, 3-aminopropyl trimethoxysilane and 3-ureidopropyl trimethoxysilane should be mentioned as amino-functional silanes. Suitable vinyl-functional silanes are, for example, vinyltrimethoxysilane, vinyldimethoxy methylsilane, vinyltriethoxysilane, vinyltris(2-methoxyethoxy) silane and vinyl triacetoxy silane.

Preferably, the dye or the pigment is a black dye or a black pigment based on a metal complex or a metal oxide, preferably a chromium complex dye having the CAS No. 117527-94-3, which is marketed by the company BASF under the name "Neozapon® Black X55, or copper chromite black spinel with the CAS-No. 68186-91-4, which is produced by the company Shepherd under the name Black 30C965. However, other metal complex dyes or pigments or metal oxide dyes, or pigments of the spinel-type are also feasible.

Particularly suitable solvents for the primer of the present invention are alcohols or solvents containing alcohols, wherein a single alcohol or a mixture of two or more alcohols can be used. Among alcohols, isopropanol has proven to be particularly advantageous.

With respect to the ratio of copolymer to organofunctional silane, the concentration of the copolymer in the mixture dissolved or dispersed in one or more solvents is preferably higher than the concentration of the one or more organofunctional silanes.

Particularly preferred, the concentration of the copolymer in the mixture dissolved or dispersed in one or more solvents is between and including 1.0 weight-percent and including 30.0 weight-percent, preferably between 2.0 weight-percent and including 20.0 weight-percent, in particular between and including 3.0 weight-percent and including 10.0 weight-percent, based in each case on the primer. Organofunctional silanes are advantageously included at a concentration of between and including 0.1 weight-percent and including 5 weight-percent, preferably between and including 0.5 and 2.0.

With respect to the ratio of the dye or pigment to the organofunctional silanes and the copolymer, in a particularly advantageous embodiment, the concentration of the dye of the mixture dissolved or dispersed in the one or more solvents may be higher than the concentration of the one or more organofunctional silanes, preferably higher than the concentration of the copolymer, particularly preferred higher than the concentration of the one or more organofunctional silanes and the copolymer combined.

In a further advantageous embodiment of the primer of the invention, the primer additionally contains one or more conventional fluorescent optical brighteners. The fluorescent optical brighteners have the function of identifying a primed substrate. It is often difficult to distinguish a primed substrate from an un-primed substrate without optical identification, because a primer is usually applied as a very thin layer and is therefore nearly invisible. A well-known fluorescent optical brightener is 2,5-thiophendiylbis (5-tert-butyl-1,3-benzoxazole), CAS No. 7128-64-5, commercially available under the trade name Tinopal OB®.

Product Features

Primers according to the above composition have excellent adhesion in particular to glass, but also to many other hydrophilic surfaces such as ceramic. Adhesive tapes with polar adhesives, especially pressure-sensitive adhesives based on copolymers of acrylic esters and acrylic acid, exhibit excellent adhesion to the primer. The excellent adhesion is demonstrated by the fact that the tape is thereafter removable mostly only through destruction, i.e. by internally splitting the tape. Even after storage for several weeks under damp conditions or changing climate conditions involving temperatures of 60° C. to 90° C. and simultaneously a relative humidity of greater than or equal to 80% of the adhesive tape bonded on the surface coated with the primer, the adhesive tape can largely be released only by way of self-destruction. Moreover, the primer is colored opaque. In this way, for example, an opaque black primer layer can be produced, which provides a completely black adhesive surface independent of the color of the adhesive tape, so that the color impression seen through the glass surface is black when the adhesive tape adheres to glass. Complete opacity can already be achieved with a layer thickness of only about 10 µm to 5 µm.

Surprisingly, it was observed in the context of the present invention that the adhesion-promoting effect of the primer also does not degrade—at least not measurable—when dyes or pigments are added to the primer. A dye or pigment concentration corresponding to a multiple of the silane concentration is easily possible without causing a deterioration of the adhesion-promoting effect.

An adhesion-promoting layer with the primer according to the invention is produced in a known manner by first applying the primer on a substrate. The solvent(s) is/are then allowed to evaporate, whereafter the adhesive tape can be applied. A few minutes, but also several days or weeks may pass between the application/evaporation of the solvent and the application of the adhesive tape.

The invention will now be described in more detail with reference to the following examples, without limiting the invention thereto.

The following test methods were used to briefly characterize the samples prepared in accordance with the invention:

Dynamic Mechanical Analysis (DMA) to Determine the Storage Modulus G' and the Loss Modulus G"

To characterize the tackiness of the copolymers contained in the primer, the storage modulus G' and the loss modulus G" were determined by Dynamic Mechanical Analysis (DMA).

The measurements were made with the shear-stress-controlled rheometer DSR 200 N from the company Rheometric Scientific in an oscillation experiment with a sinusoidally oscillating shear stress in a plate-plate arrangement. The storage modulus G' and the loss modulus G" were measured in the frequency sweep from $10^{-1}$ to $10^2$ rad/sec at a temperature of 23° C. G' and G" are defined as follows:

$G' = T/\gamma \cdot \cos(\delta)$ (T=shear stress, Γ=deformation, δ=phase angle=phase shift between shear stress and deformation vector).

$G'' = T/\gamma \cdot \sin(\delta)$ (T=shear stress, γ=deformation, δ=phase angle=phase shift between shear stress and deformation vector).

The angular frequency is defined as: $\omega = 2\pi \cdot f$ (f=frequency). The unit is rad/sec.

The thickness of the measured tacky adhesive copolymer samples was always between 0.9 and 1.1 mm (1+/−0.1 mm). The tacky copolymer samples were prepared by coating the copolymers described below on a polyester film siliconized on both sides (release liner), the solvent was evaporated at 70° C. and the resulting 100 µm thick coatings were repeatedly placed on top of each other until a thickness of about 1 mm was reached. The respectively sample diameter was 25 mm. The bias was applied with a load of 3N. The stress of the specimens was 2500 Pa for all measurements.

Bond Strength

The bond strength was determined according to PSTC-101 at room temperature. According to this method, the primer was first applied to the substrate (the base) as a thin layer. This was done by brushing the primer on the substrate. After evaporation of the solvent, the adhesive strip (the adhesive tape) to be measured was applied (bonded) to the base which now includes the primer with a thickness of about 3 µm to 10 µm. For this purpose, a strip of adhesive tape with a defined width (standard: 20 mm) was bonded to the primer-coated substrate with the dimensions of 50 mm×125 mm×1.1 mm by rolling over ten times with a 5 kg steel roller.

The time between the last roll-over and when the tape was peeled off was: a) 1 hour, and b) 3 days. The peel angle was in each case 90°, the peel speed 300 mm/min. The required peel force represents the bond strength, which is given in units of N/cm and thus refers to a standardized tape width of 1 cm. The failure mode of the adhesive bond was determined in addition to the bond strength. The back side of the measured adhesive tapes was reinforced with a 23 µm thick polyester film etched with trichloroacetic acid. All measurements were performed in a climate-controlled room at 23° C. and 50% relative humidity.

Climate-Controlled Storage

The composites substrate coated with the primer of the invention and the adhesive tape bonded thereto were stored under selected climate conditions, to determine the climate-related adhesion capacity of the bond.

Storage a) two-week storage in a climate of 85° C. and 85% relative humidity;

Storage b): two-week storage under changing climate with the cycles of 4 hours −40° C., 4 hours heating/cooling, 4 hours 80° C./80% relative humidity.

At the end of the storage period, the samples having their back side reinforced with a 23 µm thick polyester film etched with trichloroacetic acid were subjected to a peel adhesion test at a peel angle of 90° and a peel speed of 300 mm/min in a climate-controlled room at 23° C. and 50% relative humidity.

Transmission Measurement Using UV/VIS Spectrometer

The light transmission was measured in the wavelength range from 190 to 850 nm with the UV/VIS spectrometer UVIKON 923 from the company Kontron.

Static Glass Transition Temperature

The static glass transition temperature was determined by differential scanning calorimetry in accordance with DIN 53765. The information about the glass transition temperature $T_g$ relates to the glass transition temperature $T_g$ according to DIN 53765:1994-03, unless otherwise specified for a particular case. Heat-up curves run at a heating rate of 10 K/min. The samples are measured in the aluminum crucibles with perforated lid and under nitrogen atmosphere. The second heating curve is evaluated. A glass transition temperature can be identified as the inflection point in the thermogram.

Molecular Weights

The average molecular weight $M_w$, or the average molecular weight $M_N$ and the polydispersity D were determined by gel permeation chromatography (GPC). THF containing 0.1 vol.-% trifluoroacetic acid was used as eluent. The measurement was performed at 25° C. PSS-SDV, 5 µm, 103 Å (10-7 m), ID 8.0 mm×50 mm was used as pre-column. The columns PSS-SDV, 5 µm, 103 Å (10-7 m), 105 Å (10-5 m) and 106 Å (10-4 m), each with ID 8.0 mm×300 mm, were used for the separation. The sample concentration was 4 g/L, flow rate 1.0 ml per minute. The measurements were compared against PMMA standards.

Solid Content

The solids content is a measure of the fraction of non-volatile components in a polymer solution. It is determined gravimetrically by weighing the solution, then evaporating the volatile fractions for 2 hours at 120° C. in a drying oven and weighing the residue again.

K-Value (After FIKENTSCHER)

The K-value is a measure of the average molecular size of high-molecular-weight polymers. For the measurement, one-percent (1 g/100 ml) toluene solutions of polymer were prepared and their kinematic viscosities were determined using a VOGEL-OSSAG viscometer. After normalization to the viscosity of the toluene, the relative viscosity is obtained, from which the K-value can be calculated according to FIKENTSCHER (Polymer 8/1967, 381 ff.)

Glass test specimens from the company Rocholl GmbH were used as substrate (bases onto which the primer was first applied and the adhesive tape was thereafter bonded):

The adhesive tapes (adhesive test tapes), with which the primer was tested, are based on polyacrylate pressure-sensitive adhesives. The following raw materials were used to produce these polyacrylate pressure-sensitive adhesives:

Adhesive Test Tape 1

An exemplary polyacrylate pressure-sensitive adhesive tape 1 for the preparation of the test tape 1 was prepared as follows: A conventional reactor for free-radical polymerizations was filled with 54.4 kg 2-ethylhexyl acrylate, 20.0 kg of methyl acrylate, 5.6 kg acrylic acid and 53.3 kg of acetone/isopropanol (94:6). After passing nitrogen gas for 45 minutes with stirring, the reactor was heated up to 58° C., and 40 g Vazo 67 dissolved in 400 g of acetone was added. The external heating bath was then heated to 75° C. and the reaction proceeded constantly at this external temperature. After 1 h, 40 g of Vazo 67 dissolved in 400 g acetone was again added, and the mixture was diluted after 4 h with a 10 kg acetone/isopropanol mixture (94:6).

After 5 hours and again after 7 h, 120 g bis-(4-tert-butyl-cyclohexyl) peroxydicarbonate dissolved in 400 g acetone were initiated again each time. After a reaction time of 22 h, the polymerization was stopped and the mixture was cooled to room temperature. The product had a solids content of 55.9% and the solvent was removed in a concentrating extruder at reduced pressure (residual solvent content ≤0.3 weight-percent). The resulting polyacrylate had a K-value of 58.8, an average molecular weight of $M_w$=746.000 g/mol, a

| Chemical compound | Trade name | Manufacturer or Supplier | CAS-No. |
|---|---|---|---|
| Bis-(4-tert-butylcyclohexyl) peroxydicarbonate | Perkadox 16 ® | Akzo Nobel | 15520-11-3 |
| 2,2'-azobis (2-methylpropionitrile) AIBN | Vazo 64 ® | DuPont | 78-67-1 |
| 2,2'-azobis (2-methylbutyronitrile) | Vazo67 ® | DuPont | 13472-08-7 |
| Pentaerythritol tetraglycidyl | Polypox R16 ® | UPPC AG | 3126-63-4 |
| 3,4-epoxycyclohexylmethyl-3,4-epoxycyclohexanecarboxylate | Uvacure 1500 ® | Cytec Industries Inc. | 2386-87-0 |
| Triethylenetetramine | Epikure 925 ® | Hexion Specialty Chemicals | 112-24-3 |
| Microballoons (MB) (Dry unexpended microspheres, diameter 9 to 15 μm, expansion starting temperature 106 to 111° C., TMA-density ≤ 25 kg/m³) | EXPANCEL 051 DU 40 ® | EXPANCEL Nobel Industries | |
| Terpene phenol resin (softening point 110° C., $M_w$ = 500 to 800 g/mol, D 0 = 1.5) | Dertophene T110 ® | DRT resins | 25359-84-6 |
| Acrylic acid n-butyl ester | n-butyl acrylate | Rohm & Haas | 141-32-2 |
| Acrylic acid | Glacial acrylic acid | BASF | 79-10-7 |
| 2-ethylhexyl acrylate | | Brenntag | 103-11-7 |
| Methyl acrylate | | BASF | 96-33-3 |

The expansion capability of the microballoons can be described by determining TMA density [kg/m³] (Stare Thermal Analysis System from Mettler Toledo, heating rate 20° C./min). The TMA density is in this case the minimum achievable density at a particular temperature $T_{max}$ under ambient pressure before the microballoons collapse.

The softening point of the resins is determined according to DIN ISO 4625.

Furthermore, the following solvents were used to prepare the polyacrylate pressure-sensitive adhesives contained in the test tapes:

| Description | CAS-No. | Manufacturer |
|---|---|---|
| Special benzene 60/95 or Naphtha (petroleum), hydrogen-treated light | 64742-49-0 | Shell, Exxon |
| Acetone | 67-64-1 | Shell |
| Isopropanol | 67-63-0 | Shell | polydispersity of D ($M_W/M_N$)=8.9, and a static glass transition temperature of $T_g$=−35.6° C.

This base polymer was melted in a feeder extruder (single-screw extruder from the company TROESTER GmbH & Co KG, Germany) and transported with this extruder as a polymer melt through a heatable hose into a planetary roller extruder from the company Entex (Bochum). The molten resin Dertophene T 110 was then added through a metering opening, thereby producing a concentration of the resin in the melt mass of 28.3 weight-percent. Furthermore, the cross-linker Polypox R16 was added. Its concentration in the melt was 0.14 weight-percent. All components were mixed to form a homogeneous polymer melt.

The polymer melt was transferred to a twin screw extruder (Berstorff) using a melt pump and heatable hose. There, the accelerator Epikure 925 was added. Its concentration in the melt was 0.14 weight-percent. Subsequently, all gas inclusions were removed from the total polymer mixture in a vacuum dome at a pressure of 175 mbar. Microballoons were added following the vacuum zone and homogeneously incorporated in the polymer blend by a mixing element. Their concentration in the melt was 0.7 weight-percent. The resulting molten mixture was transferred to a nozzle.

After leaving the nozzle, i.e. after pressure drop, the incorporated microballoons expanded, with the pressure drop causing shear-free cooling of the polymer composition. A foamed pressure-sensitive polyacrylate adhesive was produced, which was subsequently shaped by a roll calender sheet into a web having a thickness of 0.8 mm and covered with a double-sided siliconized release film (50 μm polyester) while the chemical cross-linking reaction proceeded. The wound-up film was stored for four weeks at room temperature before being further used for primer testing. The wound-up film is the adhesive test tape 1.

Adhesive Test Tape 2

An exemplary polyacrylate pressure-sensitive adhesive 2A for the preparation of the middle layer of the three-layer adhesive test tape 2 was prepared as follows:

A conventional reactor for free-radical polymerization was filled with 30.0 kg of 2-ethylhexyl acrylate, 67.0 kg of butyl acrylate, 3.0 kg of acrylic acid and 66.7 kg of acetone/isopropanol (96:4). After passing nitrogen gas for 45 minutes with stirring, the reactor was heated to 58° C. and 50 g of Vazo 67 dissolved in 500 g of acetone was added. The external heating bath was then heated to 70° C. and the reaction proceeded constantly at this external temperature. After 1 h, 50 g of Vazo 67 dissolved in 500 g of acetone was again added, and after 2 h the mixture was diluted with 10 kg of an acetone/isopropanol mixture (96:4). After 5.5 h, 150 g of bis (4-tert-butyl-cyclohexyl) peroxy dicarbonate dissolved in 500 g of acetone was added, and after 6 h 30 min the mixture was again diluted with 10 kg of an acetone/isopropanol mixture (96:4). After 7 h, additional 150 g of bis-(4-tert-butylcyclohexyl) peroxydicarbonate, dissolved in 500 g of acetone, were added and the temperature of the heating bath was adjusted to a temperature of 60° C.

After a reaction time of 22 h, the polymerization was stopped and the mixture was cooled to room temperature. The product had a solids content of 50.2% and was dried. The resulting polyacrylate had a K-value of 75.2, an average molecular weight $M_W$=1,370,000 g/mole, a polydispersity of $D(M_W/M_N)$=17.13 and a static glass transition temperature $T_g$=−38.0° C.

This base polymer was melted in a feeder extruder (single-screw extruder from the company TROESTER GmbH & Co KG, Germany) and transported with the extruder as a polymer melt through a heatable hose into a planetary roller extruder from the company Entex (Bochum). The cross-linkers Polypox R16 was added through a metering opening. Its concentration in the melt was 0.22 weight-percent. All components were mixed to form a homogeneous polymer melt.

The polymer melt was transferred to a twin screw extruder (from the company Berstorff) using a melt pump and heatable hose. There, the accelerator Epikure 925 was added. Its concentration in the melt was 0.14 weight-percent. Subsequently, all gas inclusions were removed from the total polymer mixture in a vacuum dome at a pressure of 175 mbar. Microballoons were added following the vacuum zone and homogeneously incorporated in the polymer blend with a mixing element. Their concentration in the melt was 2.0 weight-percent. The resulting molten mixture was transferred to a nozzle.

After leaving the nozzle, i.e. after pressure drop, the incorporated microballoons expanded, with the pressure drop causing shear-free cooling of the polymer composition. A foamed pressure-sensitive polyacrylate adhesive 2A was produced, which was subsequently shaped by a roll calender sheet into a web having a thickness of 0.8 mm and covered with a double-sided siliconized release film (50 μm polyester) while the chemical cross-linking reaction proceeded. The wound-up film was stored for one day at room temperature before being further processed (see below).

An exemplary polyacrylate pressure-sensitive adhesive 2B for the preparation of the two outer layers of the three layer adhesive test tape 2 was prepared as follows:

A conventional 100 L glass reactor for free-radical polymerizations was filled with 4.8 kg of acrylic acid, 11.6 kg of butyl acrylate, 23.6 kg of 2-ethylhexyl acrylate and 26.7 kg of acetone/special benzene 60/95 (1:1). After passing nitrogen gas for 45 minutes with stirring, the reactor was heated to 58° C. and 30 g of AIBN was added. The external heating bath was then heated to 75° C. and the reaction proceeded constantly at this external temperature. After a reaction time of 1 hour, 30 g of AIBN was once more added. After 4 and 8 h, respectively, the mixture was diluted each time with 10.0 kg of acetone/special benzene 60/95 (1:1). 90 g of bis(4-tert-butyl-cyclohexyl) peroxy dicarbonate was added after 8 h and after 10 h to reduce the residual initiators. The reaction was stopped after a reaction time of 24 hours, and the mixture was cooled to room temperature. The polyacrylate was then mixed with 0.2 weight-percent of the cross-linker Uvacure® 1500, diluted with acetone to a solids content of 30%, and then coated from the solution onto a double-sided siliconized release film (50 μm polyester). (Coating speed of 2.5 m/min, drying channel 15 m, temperatures Zone 1: 40° C., Zone 2: 70° C., Zone 3: 95° C., Zone 4: 105° C.). The thickness was 50 μm. The wound-up film was stored for two days at room temperature before further used for the production of the adhesive test tape 2.

A film of polyacrylate pressure-sensitive adhesive 2B was laminated on both sides of the foamed film of the polyacrylate pressure-sensitive adhesive 2A. Immediately prior to the lamination of the film of the polyacrylate pressure-sensitive adhesive 2B on the foamed film of the polyacrylate pressure-sensitive adhesive 2A, each of the surfaces of the film of polyacrylate pressure-sensitive adhesive 2A to be laminated was pre-treated in a corona discharge in air with a dose of 35 Wmin/m². The double-sided siliconized release film of the foamed polyacrylate pressure-sensitive adhesive 2A was revealed prior to the second lamination. After the second lamination, the double-sided silicone release films of both foamed polyacrylate PSAs 2B were also revealed. The three-layer composite composed of the polyacrylate pressure-sensitive adhesive 2B/polyacrylate pressure-sensitive adhesive 2A/2B polyacrylate adhesive was wound up and stored for four weeks at room temperature before it was further used for primer testing. The wound-up composite is the adhesive test tape 2.

The exemplary composition and production methods of the aforedescribed polyacrylate pressure-sensitive adhesives are described in detail in DE 10 2010 062 669. The disclosure of this document is explicitly included in the disclosure of this invention.

For the preparation of the polyacrylate pressure-sensitive adhesive contained in the primer of the present invention, the following raw materials were used:

| Chemical compound | Trade name | Manufacturer/ Supplier | CAS-No. |
| --- | --- | --- | --- |
| N-vinylcaprolactam | | Sigma-Aldrich | 2235-00-9 |
| N-vinyl-2-pyrrolidone | | Sigma-Aldrich | 88-12-0 |

-continued

| Chemical compound | Trade name | Manufacturer/Supplier | CAS-No. |
|---|---|---|---|
| Acrylic acid n-butyl ester | n-butyl acrylate | Rohm & Haas | 141-32-2 |
| 2-ethylhexyl acrylate | | Brenntag | 103-11-7 |
| Bis-(4-tert-butylcyclohexyl) peroxydicarbonate | Perkadox 16 ® | Akzo Nobel | 15520-11-3 |
| 2,2'-azobis(2-methylpropionitrile) AIBN | Vazo 64 ® | DuPont | 78-67-1 |

Furthermore, the following solvents were used for producing the polyacrylate pressure-sensitive adhesive contained in the primer according to invention:

| Description | CAS-No. | Manufacturer |
|---|---|---|
| Special benzene 60/95 or Naphtha (petroleum), hydrogen-treated light | 64742-49-0 | Shell, Exxon |
| Acetone | 67-64-1 | Shell |

Exemplary polyacrylate pressure-sensitive adhesives for use as a component in the primer of the present invention were prepared as follows:

Primer-Pressure-Sensitive Adhesive 1

A conventional 100 L glass reactor for free-radical polymerizations was filled with 12.0 kg of N-vinyl caprolactam, 28.0 butyl acrylate and 26.7 kg of acetone/special benzene 60/95 (1:1). After passing nitrogen gas for 45 minutes with stirring, the reactor was heated to 58° C. and 30 g of AIBN was added. The external heating bath was then heated to 75° C. and the reaction proceeded constantly at this external temperature. After a reaction time of 1 hour, 30 g of AIBN was again added. After 4 and 8 h, respectively, the mixture was diluted each time with 10.0 kg of acetone/special benzene 60/95 (1:1). After 8 h and after 10 h, respectively, 90 g of bis-(4-tert-butyl-cyclohexyl) peroxy dicarbonate was added each time to reduce the residual initiators. The reaction was stopped after a reaction time of 24 hours, and the mixture was cooled to room temperature. The polyacrylate was diluted with acetone to a solids content of 34.9 weight-percent. The solution thus obtained is the primer pressure-sensitive adhesive 1.

Primer-Pressure-Sensitive Adhesive 2

A conventional 100 L glass reactor for free-radical polymerizations was filled with 8.0 kg of N-vinyl caprolactam, 32.0 kg of 2-ethylhexyl acrylate and 26.7 kg of acetone/special benzene 60/95 (1:1). After passing nitrogen gas for 45 minutes with stirring, the reactor was heated to 58° C. and 30 g of AIBN was added. The external heating bath was then heated to 75° C., and the reaction proceeded constantly at this external temperature. After a reaction time of 1 hour, 30 g of AIBN was again added. After 4 and 8 h, respectively, the mixture was diluted each time with 10.0 kg of acetone/special benzene 60/95 (1:1). After 8 h and after 10 h, respectively, 90 g of bis-(4-tert-butyl-cyclohexyl) peroxy dicarbonate was added each time to reduce the residual initiators. The reaction was stopped after a reaction time of 24 hours, and the mixture was cooled to room temperature. The polyacrylate was diluted with acetone to a solids content of 34.9 weight-percent. The solution thus obtained is the primer pressure-sensitive adhesive 2.

Primer-Pressure-Sensitive Adhesive 3

A conventional 100 L glass reactor for free-radical polymerizations was filled with 8.0 kg of N-vinyl-2-pyrrolidone, 32 kg of butyl acrylate, and 26.7 kg of acetone/special benzene 60/95 (1:1). After passing nitrogen gas for 45 minutes with stirring, the reactor was heated to 58° C. and 30 g of AIBN was added. The external heating bath was then heated to 75° C. and the reaction proceeded constantly at this external temperature. After a reaction time of 1 hour, 30 g of AIBN was added. After 4 and 8 h, respectively, the mixture was diluted each time with 10.0 kg of acetone/special benzene 60/95 (1:1). After 8 h and after 10 h, respectively, 90 g of bis-(4-tert-butyl-cyclohexyl) peroxy dicarbonate was added each time to reduce the residual initiators. The reaction was stopped after a reaction time of 24 hours, and the mixture was cooled to room temperature. The polyacrylate was diluted with acetone to a solids content of 34.9 weight-percent. The solution thus obtained is the primer pressure-sensitive adhesive 3.

Primer-Pressure-Sensitive Adhesive 4 for a Comparative Example

A conventional 100 L glass reactor for free-radical polymerizations was filled with 154.6 kg of butyl acrylate, 24.4 kg of 2-ethylhexyl acrylate and 26.7 kg of acetone/special benzene 60/95 (1:1). After passing nitrogen gas for 45 minutes with stirring, the reactor was heated to 58° C. and 30 g of AIBN was added. The external heating bath was then heated to 75° C. and the reaction proceeded constantly at this external temperature. After a reaction time of 1 hour, 30 g of AIBN was again added. After 4 and 8 h, respectively, the mixture was diluted each time with 10.0 kg of acetone/special benzene 60/95 (1:1). After 8 h and after 10 h, respectively, 90 g of bis-(4-tert-butyl-cyclohexyl) peroxy dicarbonate was added each time to reduce the residual initiators. The reaction was stopped after a reaction time of 24 hours, and the mixture was cooled to room temperature. The polyacrylate was diluted with acetone to a solids content of 34.9 weight-percent. The solution thus obtained is the primer pressure-sensitive adhesive 4.

The primer pressure-sensitive adhesives 1 to 4 were briefly characterized using DMA measurements. The G' curve and the G" curve of the primer pressure-sensitive adhesives 1 to 4 were always at least partly in the range from $10^3$ to $10^7$ Pa. in the deformation frequency range of $10^0$ to $10^1$ rad/sec at 23° C.

For producing the primers of the invention, the primer pressure-sensitive adhesives produced and with compositions described above and the following raw materials were used:

| Chemical compound/Description (as described by the manufacturer) | Trade name | Manufacturer or Supplier | CAS-No. |
|---|---|---|---|
| 3-glydicoxypropyl trimethoxy silane | Geniosil ® GF 80 | Wacker Chemie | 2530-83-8 |
| 3-aminopropyl triethoxy silane | Geniosil ® GF 93 | Wacker Chemie | 919-30-2 |
| vinyltrimethoxysilane | Geniosil ® XL 10 | Wacker Chemie | 2768-02-7 |

Furthermore, in addition to the solvents contained in the primer pressure-sensitive adhesives, the following solvent was used for preparing the primers according to the invention:

| Description | CAS-No. | Manufacturer or Supplier |
|---|---|---|
| Isopropanol | 67-63-0 | Shell |

The following dyes or pigments were incorporated into the exemplified primers:

| Chemical compound/ Description (as described by the manufacturer) | Trade name | Manufacturer or Supplier | CAS-No. |
|---|---|---|---|
| Chromium complex dye C.I. Solvent Black 29 | Neozapon Black X55 ® | BASF | 117527-94-3 |
| Copper chromite black spinel C.I. Pigment Black 28 | Black 30C965 ® | Shepherd | 68186-91-4 |

EXAMPLES

Example 1

Composition of the primer:

| Raw material/component | Weight-percent |
|---|---|
| Primer-pressure-sensitive adhesive 1 (34.9 weight-percent solid fraction) | 10.5 |
| GENIOSIL ® GF80 | 1.0 |
| Neozapon Black X55 ® | 5.0 |
| Isopropanol | 88.5 |

The primer was tested in the following manner with the adhesive test tapes, wherein the following results were obtained:

| Adhesive test tape | Substrate | Bond strength (300 mm/min) (N/cm) after 1 hour | after 3 days | Bond strength after climate-controlled-storage (300 mm/min) (N/cm) a) 2 wks. 85°/ 85% rel. humidity | b) 2 wks. climate change |
|---|---|---|---|---|---|
| 1 | Glass | 64 (K) | 59 (K) | 64 (K) | 65 (K) |
| 2 | Glass | 60 (K) | 62 (K) | 61 (K) | 60 (K) |

K = Cohesive splitting of the adhesive tape (The percentage refers to the cohesive fraction), The non-cohesive fraction is the adhesive fraction.)

A 5 µm thick layer of this primer on glass was opaque. The transmission in the wavelength range from 300 nm to 650 nm was 0%.

Example 2

Composition of the primer:

| Raw material/component | Weight-percent |
|---|---|
| Primer - pressure-sensitive adhesive 1 (34.9 weight-percent solid fraction) | 10.5 |
| GENIOSIL ® GF93 | 1.0 |
| Neozapon Black X55 ® | 5.0 |
| Isopropanol | 83.5 |

The primer was tested with the adhesive test tapes in the following manner, wherein the following results were obtained:

| Adhesive test tape | Substrate | Bond strength (300 mm/min) (N/cm) after 1 hour | after 3 days | Bond strength after climate-controlled storage (300 mm/min) (N/cm) a) 2 wks 85° C./ 85% rel. humidity | b) 2 wks. climate change |
|---|---|---|---|---|---|
| 1 | Glass | 54 (90% K) | 62 (K) | 60 (K) | 64 (K) |
| 2 | Glass | 52 (80% K) | 62 (K) | 59 (K) | 58 (K) |

K = Cohesive splitting of the adhesive tape (The percentage refers to the cohesive fraction), The non-cohesive fraction is the adhesive fraction.)

A 10 µm thick layer of this primer on glass was opaque. The transmission in the wavelength range from 300 nm to 650 nm was 0%.

Example 3

Composition of the primer:

| Raw material/component | Weight-percent |
|---|---|
| Primer - pressure-sensitive adhesive 1 (34.9 weight-percent solids) | 10.5 |
| GENIOSIL ® XL10 | 1.0 |
| Neozapon Black X55 ® | 5.0 |
| Isopropanol | 83.5 |

The primer was tested in the following manner with adhesive test strips, wherein the following results were obtained:

| Adhesive test tape | Substrate | Bond strength (300 mm/min) (N/cm) | | Bond strength after climate - controlled storage (300 mm/min) (N/cm) | |
|---|---|---|---|---|---|
| | | after 1 hour | after 3 days | a) 2 wks 85° C./ 85% rel. humidity | b) 2 wks. climate change |
| 1 | Glass | 50 (80% K) | 59 (K) | 61 (K) | 58 (K) |
| 2 | Glass | 49 (70% K) | 56 (K) | 59 (K) | 59 (K) |

K = Cohesive splitting of the adhesive tape (The percentage refers to the cohesive fraction), The non-cohesive fraction is the adhesive fraction.)

A 5 μm thick layer of this primer on glass was opaque. The transmission in the wavelength range from 300 nm to 650 nm was 0%.

Example 4

The composition of the primer:

| Raw material/component | Weight-percent |
|---|---|
| Primer - pressure-sensitive adhesive 2 (34.9 weight-percent solids) | 10.5 |
| GENIOSIL ® GF 80 | 1.0 |
| Neozapon Black X55 ® | 5.0 |
| Isopropanol | 83.5 |

The primer was tested in the following manner with adhesive test strips, wherein the following results were obtained:

| Adhesive test tape | Substrate | Bond strength (300 mm/min) (N/cm) | | Bond strength after climate - controlled storage (300 mm/min) (N/cm) | |
|---|---|---|---|---|---|
| | | after 1 hour | after 3 days | a) 2 wks 85° C./ 85% rel. Humidity | b) 2 wks. climate change |
| 1 | Glass | 59 (90% K) | 63 (K) | 59 (K) | 61 (K) |
| 2 | Glass | 60 (90% K) | 60 (K) | 62 (K) | 65 (K) |

K = Cohesive splitting of the adhesive tape (The percentage refers to the cohesive fraction), The non-cohesive fraction is the adhesive fraction.)

An 8 μm a thick layer of this primer on glass was opaque. The transmission in the wavelength range from 300 nm to 650 nm was 0%.

Example 5

Composition of the primer:

| Raw material/component | Weight-percent |
|---|---|
| Primer - pressure-sensitive adhesive 3 (34.9 weight-percent solids) | 10.5 |
| GENIOSIL ® GF 80 | 1.0 |
| Neozapon Black X55 ® | 5.0 |
| Isopropanol | 83.5 |

The primer was tested in the following manner with adhesive test strips, wherein the following results were obtained:

| Adhesive test tape | Substrate | Bond strength (300 mm/min) (N/cm) | | Bond strength after climate-controlled storage (300 mm/min) (N/cm) | |
|---|---|---|---|---|---|
| | | after 1 hour | after 3 days | a) 2 wks 85° C./ 85% rel. Humidity | b) 2 wks. climate change |
| 1 | Glass | 55 (80% K) | 60 (K) | 62 (K) | 65 (K) |
| 2 | Glass | 54 (70% K) | 61 (K) | 63 (K) | 65 (K) |

K = Cohesive splitting of the adhesive tape (The percentage refers to the cohesive fraction), The non-cohesive fraction is the adhesive fraction.)

A 9 μm a thick layer of this primer on glass was opaque. The transmission in the wavelength range from 300 nm to 650 nm was 0%.

Example 6

The composition of the primer:

| Raw material/component | Weight-percent |
|---|---|
| Primer - pressure-sensitive adhesive 1 (34.9 weight percent solids) | 15.5 |
| GENIOSIL ® GF 80 | 2.0 |
| Black 30C965 ® | 10.0 |
| Isopropanol | 73.5 |

The primer was tested in the following manner with the adhesive test tapes, wherein the following results were obtained:

| Test adhesive-tape | Substrate | Bond strength (300 mm/min) (N/cm) | | Bond strength after air storage (300 mm/min) (N/cm) | |
|---|---|---|---|---|---|
| | | after 1 hour | after 3 days | a) 2 wks 85° C./ 85% rel. Humidity | b) 2 wks. climate change |
| 1 | Glass | 52 (70% K) | 59 (K) | 63 (K) | 64 (K) |
| 2 | Glass | 51 (70% K) | 60 (K) | 67 (K) | 66 (K) |

K = Cohesive splitting of the adhesive tape (The percentage refers to the cohesive fraction), The non-cohesive fraction is the adhesive fraction.)

A 10 μm thick layer of this primer on glass was opaque. The transmission in the wavelength range from 300 nm to 650 nm was 0%.

Comparative Example

Composition of the comparative primer:

| Raw material/component | Weight-percent |
|---|---|
| Primer - pressure-sensitive adhesive 4 (34.9 weight-percent solid fraction) | 10.5 |
| GENIOSIL ® GF 80 | 1.0 |
| Neozapon Black X55 ® | 5.0 |
| Isopropanol | 83.5 |

The primer was tested in the following manner with adhesive test strips, wherein the following results were obtained:

| Adhesive test tape | Substrate | Bond strength (300 mm/min) (N/cm) after 1 hour | Bond strength (300 mm/min) (N/cm) after 3 days | Bond strength after climate-controlled storage (300 mm/min) (N/cm) a) 2 wks 85° C./ 85% rel. Humidity | Bond strength after climate-controlled storage (300 mm/min) (N/cm) b) 2 wks. climate change |
|---|---|---|---|---|---|
| 1 | Glass | 9 (A) | 15 (A) | 25 (A) | 20 (10% K) |
| 2 | Glass | 3 (A) | 10 (A) | 22 (10% K) | 13 (A) |

K = Cohesive splitting of the adhesive tape (The percentage refers to the cohesive fraction), The non-cohesive fraction is the adhesive fraction.)
A = Adhesive peeling the adhesive tape from the primer or of the primer from the substrate

The invention claimed is:

1. Primer, comprising a mixture dissolved or dispersed in one or more solvents, the mixture comprising:
   a copolymer obtained through copolymerization of vinylcaprolactam and/or vinylpyrrolidone monomers, and one or more of the following monomers:
   a) an acrylic acid ester of a linear primary alcohol containing 2 to 10 carbon atoms in the alkyl group of the alcohol,
   b) an acrylic acid ester of a branched, non-cyclic alcohol having 4 to 12 carbon atoms in the alkyl group of the alcohol, and
   c) acrylic acid,
   the mixture further comprising one or more organofunctional silanes, and,
       a dye or a pigment which is black and which is selected from the group consisting of a copper chromite black spinel having the CAS No. 68186-91-4 and a chromium complex dye having the CAS-No. 117527-94-3.

2. Primer according to claim 1 wherein the copolymer is a pressure-sensitive adhesive.

3. Primer according to claim 1 wherein the copolymer further contains d) one or more additional copolymerizable monomers.

4. Primer according to claim 1 wherein the copolymer contains a maximum of 50 weight-percent of vinylcaprolactam and/or vinylpyrrolidone monomers based on the sum of all monomers of the copolymer.

5. Primer according to claim 1 wherein the copolymer contains at least 10 weight-percent of vinylcaprolactam and/or vinylpyrrolidone monomers based on the sum of all monomers of the copolymer.

6. Primer according to claim 1 wherein the copolymer contains a maximum of 20 weight-percent of acrylic acid monomer based on the sum of all monomers of the copolymer.

7. Primer according to claim 1 wherein one of the monomers is butyl acrylate.

8. Primer according to claim 1 wherein the one or more organofunctional silanes is glycidoxy-functional or amino-functional or vinyl-functional.

9. Primer according to 1 wherein the one or more solvents is isopropanol, another alcohol, or solvents contain isopropanol or another alcohol.

10. Primer according to claim 1 wherein the concentration of the copolymer of the mixture dissolved or dispersed in the one or more solvents is higher than the concentration of the one or more organofunctional silanes.

11. Primer according to claim 1 wherein the concentration of the copolymer of the mixture dissolved or dispersed in the one or more solvents is between and including 1.0 weight-percent and including 30.0 weight-percent.

12. Primer according to claim 1 wherein the concentration of the dye or pigment of the mixture dissolved or dispersed in the one or more solvents is higher than the concentration of the one or more organofunctional silanes.

13. Primer according to claim 4 wherein the copolymer contains a maximum of 40 weight-percent of vinylcaprolactam and/or vinylpyrrolidone monomers based on the sum of all monomers of the copolymer.

14. Primer according to claim 6 wherein the copolymer contains a maximum of 10 weight-percent of acrylic acid monomer based on the sum of all monomers of the copolymer.

15. Primer according to claim 14 wherein the copolymer contains 0 weight-percent of acrylic acid monomer based on the sum of all monomers of the copolymer.

16. Primer according to claim 1, wherein the copolymer is the sole copolymer present in the mixture.

17. A method of preparing an adhesion-promoting material comprising the step of:
   including the primer according to claim 1 within the material.

* * * * *